Figure 1:
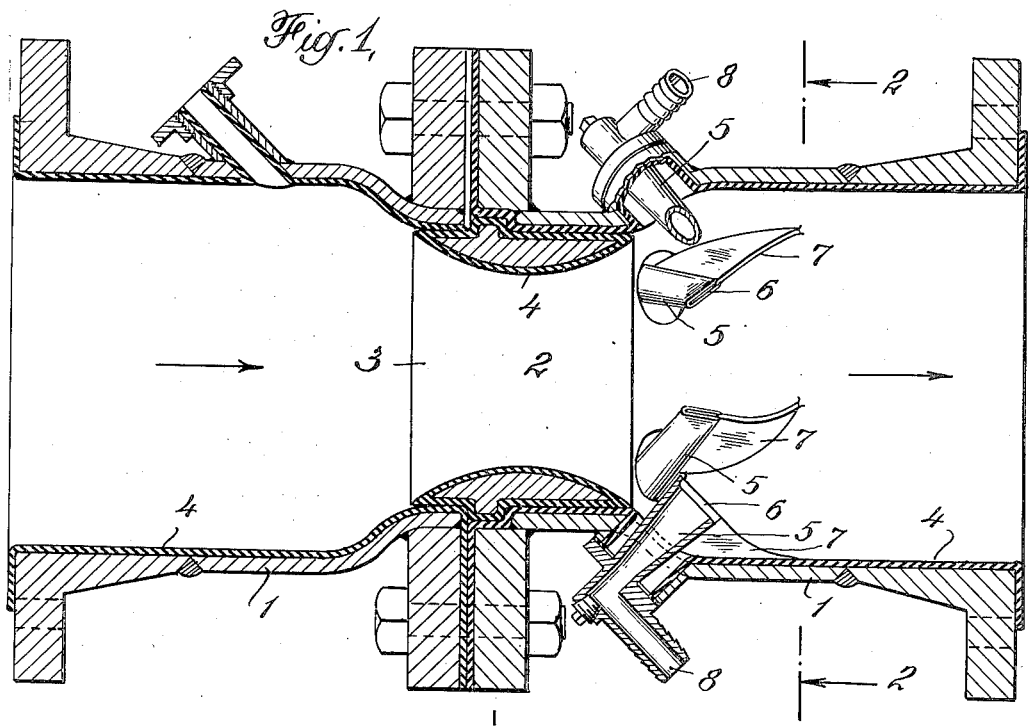

Oct. 24, 1944. G. A. PETROE 2,361,150
METHOD AND APPARATUS FOR ADMITTING CHLORINE TO LIQUID STREAMS
Filed Jan. 24, 1941

INVENTOR
GREGORY A. PETROE
BY
Pennie, Davis, Marvin & Edmonds
ATTORNEYS

Patented Oct. 24, 1944

2,361,150

UNITED STATES PATENT OFFICE 2,361,150

METHOD AND APPARATUS FOR ADMITTING CHLORINE TO A LIQUID STREAM

Gregory A. Petroe, Niagara Falls, N. Y., assignor to The Mathieson Alkali Works, Inc., New York, N. Y., a corporation of Virginia Application January 24, 1941, Serial No. 375,740

8 Claims. (Cl. 8—156)

This invention relates to a method and apparatus for admitting chlorine to a liquid stream flowing through a pipe and dispersing it throughout the body of the liquid. It has been customary to add chlorine to such a stream through a simple pipe connection. It is difficult, however, to get complete dispersion by this method, which necessarily reduces the total quantity of chlorine that can be added through a given connection. Moreover the pressure of the stream forces some of the liquid into the chlorine inlet pipe, and when that liquid is paper pulp stock, plugging and corrosion of the piping system frequently ensue. In accordance with the present invention I have provided a more efficient method and means for adding chlorine to and dispersing it in a flowing stream, a method and means particularly adapted to the chlorination of paper pulp.

When a pipe through which a liquid stream is flowing is constricted, as in a Venturi throat, a vena contracta is formed on the downstream side of the throat, creating a region of reduced pressure. I have taken advantage of this in solving the problem of adding chlorine to a stream of paper pulp. The pipe through which the pulp is flowing is provided with a constriction or Venturi throat and just beyond this in the region of reduced pressure on the downstream side the chlorine inlet nozzles are installed. The diminished back pressure in this region not only accelerates the distribution of chlorine throughout the pulp mass but lessens the tendency of the stream to back up into the chlorine inlets with its attendant disadvantages. A plurality of inlet nozzles are provided, spaced around the pipe, thus introducing the chlorine at many places at once. The nozzles are arranged at an angle to a radius and are pitched forward in the direction of flow. The entering chlorine thus sets up a helical whirl in the pulp stream which improves and accelerates dispersion. To increase the turbulence each chlorine inlet nozzle is provided with a helical baffle tapering downstream. The discharge ends of the chlorine nozzles are fish-tail in shape, terminating in long, narrow orifices which serve to accelerate chlorine flow at the points of discharge, thereby not only aiding dispersion, but largely preventing reverse migration of water from the pulp stream into the chlorine line. The shape of these orifices also makes difficult the entrance of fibers as most passing fibers will bridge the narrow dimension of the slots. The forward pitch of the nozzles prevents accumulation of fiber bundles on the upstream side.

Figure 2:
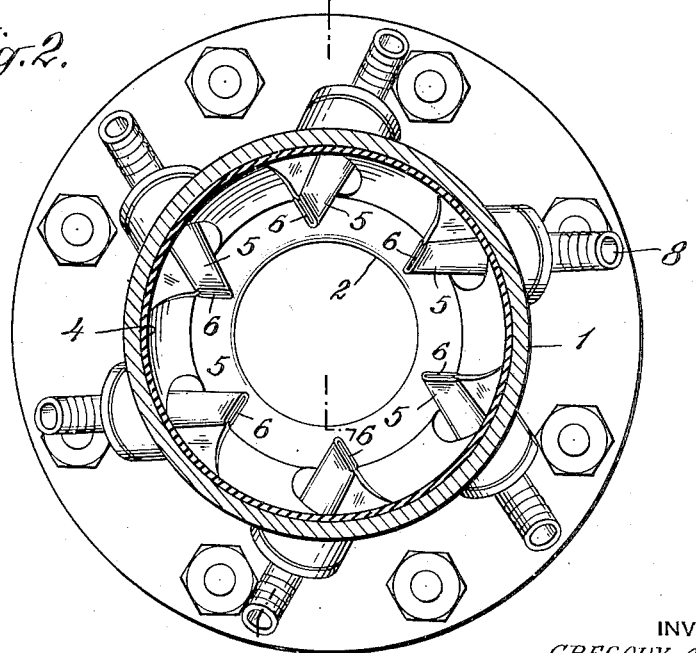

In the accompanying drawing I have illustrated a preferred embodiment of the improvements of my invention. In the drawing Figure 1 is a longitudinal section through a pipe equipped with a Venturi throat and adjacent chlorine inlets taken along line 1—1 of Figure 2, and Figure 2 is a transverse section taken along line 2—2 of Figure 1.

In the drawing 1 represents two abutting pipe sections provided with a constriction or Venturi throat 2 at their coupling. This throat is formed by reductions in the diameters of the pipe sections themselves plus a collar 3 having a curved inner face which merges with the inner faces of the sections 1 and forms a smooth throat. The sections and the collar are provided with an acid-resisting rubber lining 4.

The liquid stream flows through the pipe sections in the direction of the arrow. Adjacent the throat on the downstream side, six chlorine inlet nozzles 5 are spaced about the periphery of the farthest pipe section. These nozzles are set at an angle to the radius of a cross-section of the pipe at their point of emergence, as shown in Figure 2, and are pitched forward in a downstream direction, as shown in Figure 1. Each of these nozzles is provided with a flattened fish-tail discharge end 6 having a long and narrow discharge orifice. Each nozzle is provided with a helical baffle 7 which curves away from it on the downstream side and tapers to zero elevation over a short distance, as shown in Figure 1. Chlorine is fed to the nozzle 5 through pipes 8.

The apparatus operates as follows: Assume a stream of pulp stock is moving through the pipe in the direction of the arrow. As it passes through the throat 2 its velocity is increased and its pressure decreased in accordance with well-known laws. I have found in actual practice that a pressure of seventeen pounds to the square inch on the upstream side of the throat diminished to less than four pounds per square inch on the downstream side at the point where the chlorine nozzles are mounted. Chlorine forced into the stream at this point is dispersed throughout the pulp mass more thoroughly than if introduced where the pressure is higher, and the tendency for the water in the stream to back up into the chlorine lines is reduced. Moreover in view of the shape of the discharge orifices it is difficult for pulp fibers to find their way into the chlorine pipes. As the chlorine emerges from the long narrow slots which constitute the discharge orifices of the nozzles, it is moving with considerable speed. As each gas jet strikes the pulp stream off center and tangentially of an imaginary core and as each nozzle is pitched forward in a downstream direction, the total effect is to impart a helical whirl to the pulp and create a decided turbulence. The whirling stream passing the nozzles is picked up by the helical baffles and given a further twist so it is pretty well churned up as it passes downstream. These baffles, moreover, tend to create slots in the pulp mass in which the chlorine gas is trapped. The result of all this is to effect an intimate mixture of the chlorine with the pulp and increase the efficiency of the dispersion.

I claim:

1. The method of admitting chlorine to a liquid stream carrying solids in suspension and dispersing it throughout the body of the liquid comprising flowing the liquid through a pipe having a Venturi throat, thereby creating a region of diminished pressure, and forcing chlorine under pressure into the stream in that region on the downstream side of the throat, tangentially of the stream and in a direction pointing downstream, to create a whirling turbulence which brings the chlorine into intimate contact with the liquid.

2. The method of admitting chlorine to a stream of paper pulp and dispersing it throughout the body of the pulp comprising flowing the pulp through a pipe having a Venturi throat thereby creating a region of diminished pressure, and introducing chlorine under pressure tangentially of the stream in that region and in a downstream direction to create a whirling turbulence which brings the chlorine into intimate contact with the pulp.

3. The method of admitting chlorine to a stream of paper pulp and dispersing it throughout the body of the pulp comprising flowing the pulp through a pipe having a Venturi throat thereby creating a region of diminished pressure, creating a series of slots in the pulp mass just beyond the throat on the downstream side, and introducing chlorine under pressure into the slots tangentially of the stream and in a downstream direction creating a whirling turburence which brings the chlorine into intimate contact with the pulp.

4. The method of dispersing chlorine throughout a body of liquid paper pulp comprising flowing the pulp in a stream, creating a region of diminished pressure in the stream, and introducing chlorine under pressure into the stream in that region, tangentially of the stream and in a downstream direction to create a whirling turbulence which brings the chlorine into intimate contact with the pulp.

5. Apparatus for admitting chlorine to a liquid stream and dispersing it throughout the body of the liquid comprising a pipe, a Venturi throat in the pipe, and an inlet nozzle for chlorine adjacent the throat on the downstream side extending into the pipe at an angle to a radius of a cross-section of the pipe, pitched forward in the direction of flow and terminating in a discharge orifice whose length is several times its width.

6. Apparatus for admitting chlorine to a liquid stream and dispersing it throughout the body of the liquid comprising a pipe, a Venturi throat in the pipe, and inlet nozzle for chlorine adjacent the throat on the downstream side extending into the pipe at an angle to a radius of a cross-section of the pipe, and pitched forward in the direction of flow, and a helical baffle extending downstream from the nozzle.

7. Apparatus for admitting chlorine to a liquid stream and dispersing it throughout the body of the liquid comprising a pipe, a Venturi throat in the pipe, a plurality of inlet nozzles for chlorine spaced around the pipe, adjacent the throat on the downstream side, extending into the pipe at an angle to a radius of a cross-section of the pipe, pitched forward in the direction of flow and terminating in long narrow discharge orifices, and a helical baffle extending downstream from each nozzle.

8. Apparatus for admitting chlorine to a liquid stream and dispersing it throughout the body of the liquid comprising a pipe, a Venturi throat in the pipe, and an inlet nozzle for chlorine in the pipe on the downstream side of the Venturi throat and adjacent the plane where the throat merges into the straight portion of the pipe, said inlet nozzle, extending into the pipe at an angle to a radius of a cross-section of the pipe, and pitched forward in the direction of flow.

GREGORY A. PETROE.